Nov. 27, 1951            I. HORDES            2,576,224

APPARATUS FOR CASTING DENTAL RESTORATIONS

Filed Dec. 8, 1948            2 SHEETS—SHEET 1

INVENTOR.
IRVING HORDES
BY Edw. S. Higgins
ATTORNEY

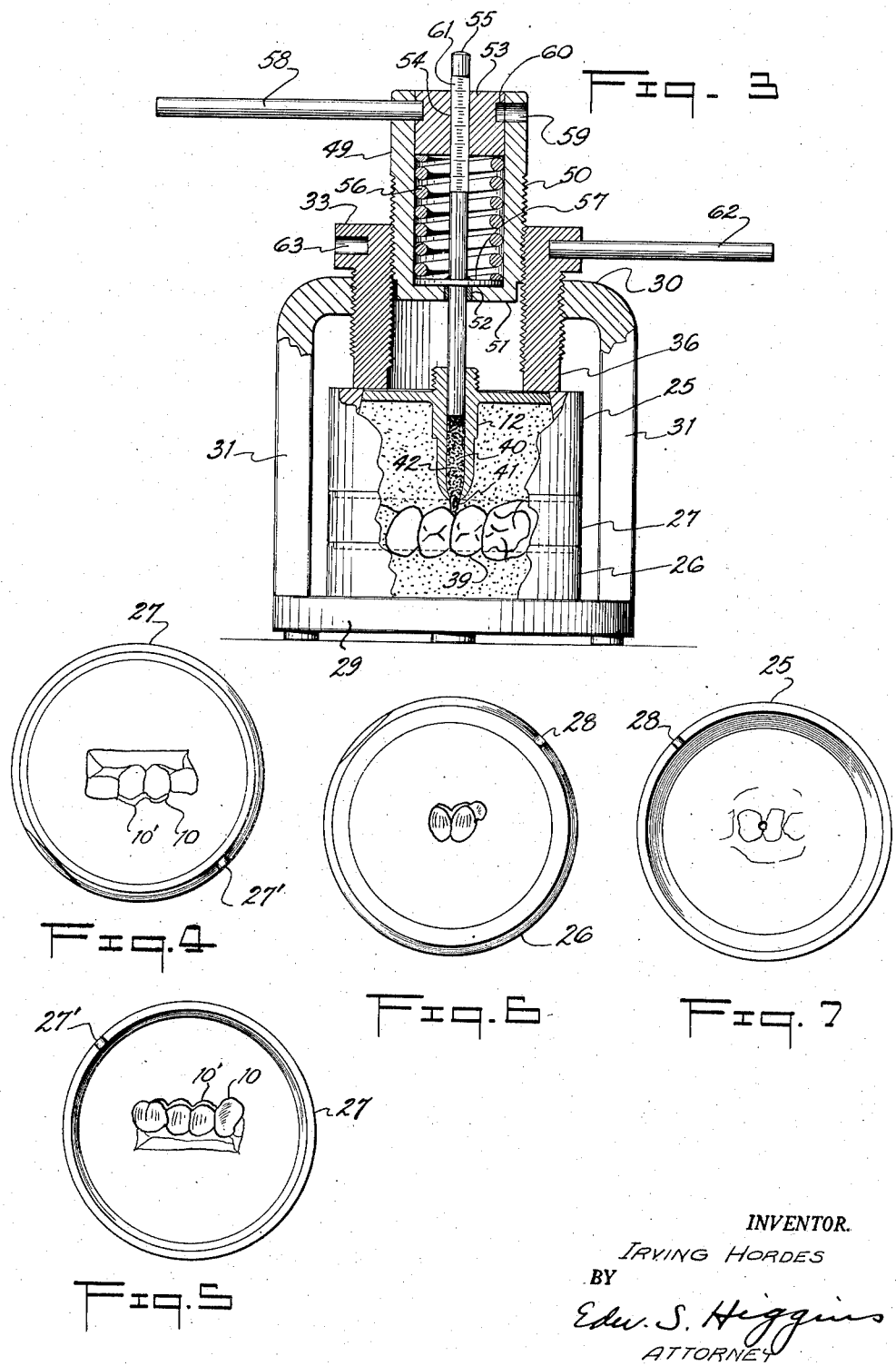

Patented Nov. 27, 1951

2,576,224

UNITED STATES PATENT OFFICE 2,576,224

APPARATUS FOR CASTING DENTAL RESTORATIONS

Irving Hordes, Yonkers, N. Y.

Application December 8, 1948, Serial No. 64,117

3 Claims. (Cl. 18—5.7)

This invention relates particularly to improvements in apparatus for use in the casting of dental restorations, that is, in forming a bridge and other dental structures.

A primary object of the present invention is to produce a novel apparatus which is particularly suited for casting dental restorations using a plastic or other suitable material as the casting material.

Another object is to provide a mold within a flask in which hand packing and automatic pressure combined or automatic pressure alone may be used to condense the plastic material and augment the supply thereof to the cavity in which the restoration is to be formed, thus assuring a thoroughly condensed plastic composition.

A specific object is to provide a flask with a ring or section adapted to support the wax pattern and mold formed therefrom in such a manner that the pattern and mold are exposed top and bottom for inspection and cleaning purposes if necessary.

Another object is to provide a flask of this kind with improved means for indicating the pressure exerted upon the denture material.

Other objects of the invention are to provide apparatus of this kind that is easily manipulated, is inexpensive, comparatively simple in construction, is rugged and is readily adjustable to meet any requirements in the processing of dental restorations.

Other objects and advantages of the invention will be apparent from the description thereof to follow taken in connection with the accompanying drawing in which—

Fig. 3 is a view similar to Fig. 2 but showing mechanism in position for automatically pressing the plastic material into the mold.

Figs. 4 and 5 are top and bottom plan views of the middle ring section of the flask as viewed in Fig. 1.

Fig. 6 is a bottom plan view of the top ring section as viewed in Fig. 1.

Fig. 7 is a top plan view of the bottom ring section as viewed in Fig. 1.

Figure 1:
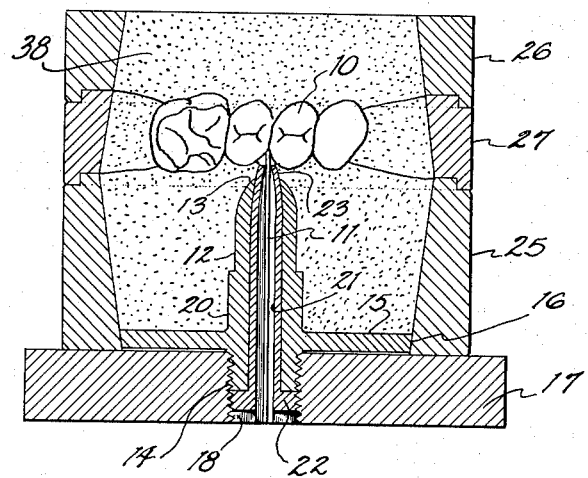
Fig. 1 is a vertical sectional view of my improved apparatus showing the flask in position on its support and with the sprue forming members in position and carrying a wax pattern which forms the mold in the investment material.

The plastic material used for making dental restorations should be in a soft but viscous state, that is, about the consistency of putty or a thick paste. Plastic in this condition may be obtained or prepared in two ways. Powdered or granulated plastic in its cured or polymeric form is mixed with a portion of the plastic in liquid or monomeric form in a manner known to the dental technician in preparing plastic to be used for forming artificial dentures, dental acrylic jacket crowns, bridges, inlays and the like. The viscous plastic may be obtained also by using polymeric plastic in powdered, granular or biscuit form and heating it until it has the proper viscous consistency.

The investment material for the casting may be formed in the customary manner using known material such as plaster of Paris, artificial stone or the like.

Referring to the drawings, a wax pattern 10 consisting of gold cusps with wax pontics forming a bridge or the like is formed in a known manner after which it is mounted upon a pin or wire 11. A cavity forming metal sleeve or outer tubular sprue member 12 is formed with an inwardly tapered neck portion 13 at its upper end providing a restricted opening. The lower end of the sprue member is formed with an externally screw-threaded portion 14 and with an integral disc 15 forming a base for the sprue member. The disc has a tapered peripheral edge 16. A disc-like support or base 17 has a central internally screw-threaded opening 18. The screw-threaded portion 14 of the sprue member is adapted to be screwed into the threaded opening 18 of support 17 to seat the sprue member removably on the support 17. The outer surface of the sprue member 12 is formed with angle portions 20 to receive a tool for tightening and loosening said sprue member.

Another sprue member is adapted to be positioned inside the outer sprue member 12 and is formed with a tubular body portion 21 having a base or flange 22 at its lower end and a tapered neck portion 23 slitted at its upper end. The outer periphery of the flange 22 is formed with screw threads.

A sectional flask is removably supported on the disc-like base 17 around the sprue member. The flask comprises a lower mold or ring section 25, an upper mold or ring section 26 and an intermediate mold or ring section 27 as viewed in Figure 1, said sections having interlocking flange portions on their meeting edges. The meeting edges may be formed with pry-notches and the intermediate section may have pins 27' on its edges adapted to be received in notches 28 on the other sections to facilitate connection and separation of the sections. The mold sections have tapered inner walls in opposed relation.

To assemble the parts, the outer sprue member 12 is positioned in the bottom of the lower flask section 25 as viewed in Figure 1 with the tapered edge of disc 15 engaging the inner tapered wall of said section 25 to seal said section at its lower end. The lower section 25 with the outer sprue member mounted therein is placed on the upper surface of support 17. The threaded portion 14 of the outer sprue member will be in position to engage the threads of the opening 18 of the disc 17 and upon turning of said outer sprue member, said sprue member and lower section 25 will be secured to the support 17. The inner sprue member is then inserted through the opening 18 of support 17 from the bottom and its flange 22 threaded to the threads of said opening below the threaded portion 14 of the outer sprue member. The upper end of the tapered neck portion 23 of the inner sprue member will project slightly above the upper end of the outer sprue member. With the wax pattern 10 secured to the top pointed end of wire 11, said wire is dropped through the opening in the neck portion 23 and body of the inner sprue member until the pattern rests on the upper edge of the neck portion. The wax pattern is thus held spaced from the upper end of the outer sprue member. The screw-threaded flange 22 of the inner sprue member is set upon by a suitable tool and the sizes of the openings in the tapered neck portions 13 and 23 of the outer sprue member and inner sprue member, respectively, are such that when the slitted neck portion engages the wall of the restricted opening in the tapered neck portion 13, said slitted neck portion becomes contracted and grips the wire thereby serving as a chuck member to hold the wire with its wax pattern in proper position. It will be noted that the wax pattern is framed by the intermediate ring section 27, that is, it is positioned within the confines of said ring section 27, projecting substantially from top to bottom thereof and exposed on such top and bottom surfaces.

Figure 2:
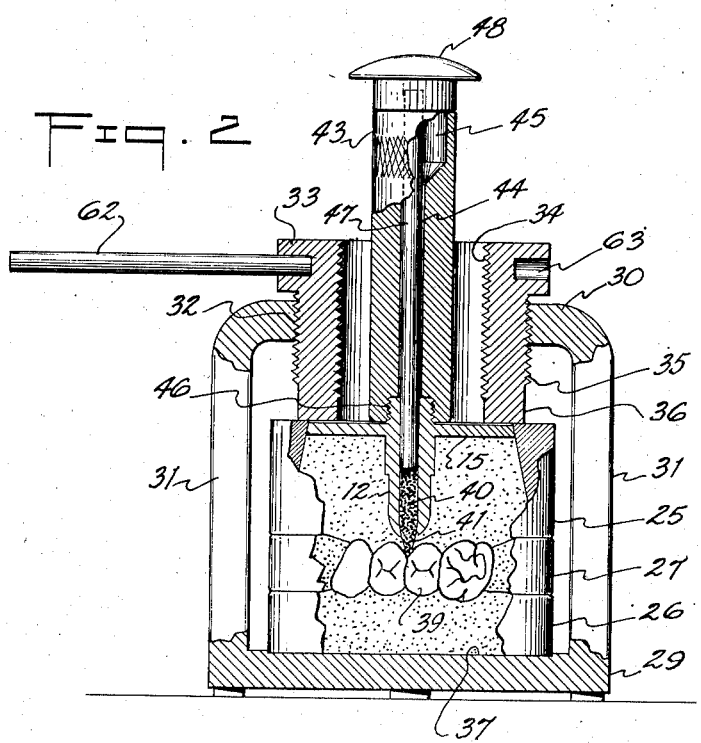
Fig. 2 is a vertical sectional view of the improved apparatus showing the parts in position for receiving plastic material in the mold in the flask and showing apparatus in position for hand packing such plastic material.

The sections of the flask may be held in superimposed relation by means of clamping apparatus consisting of a frame formed of a metal casting and having a circular base portion 29 and a circular top portion 30 of smaller dimensions, said base and top portions being connected at their sides as viewed in Figure 2 by narrow upright arms 31 leaving the front and rear of the frame open. The top portion 30 is formed with a centrally internally screw-threaded opening 32 and removably mounted in this opening is a nut member 33 having internal screw threads 34 and external screw threads 35 with a skirt portion 36 depending from the threads 35. The upper surface of the base 29 is countersunk or depressed as indicated at 37. When the flask is placed in the depression on base 29, it is centered and the lower edge of the skirt portion 36 of the nut member is in alignment with the upper edge of the uppermost flask section, for instance, section 25 as viewed in Figure 2 so that upon setting up on the nut member, the entire unit including the flask is securely clamped in position as shown in Figure 2 thereby preventing displacement of the parts.

In using the improved apparatus, investment material 38 is poured into the lower mold section 25 as viewed in Figure 1 and filled from bottom to top thereof leaving the wax pattern 10 projecting above the said investment material. The material may be suitably tapped and permitted to harden. A coating of separating material is then applied to the upper hardened surface of the investment material to facilitate separation of the lower and middle ring section. The intermediate or middle ring section 27 is then filled with investment material in the same manner leaving the upper wax surface of the bridge pattern exposed. After hardening the upper surface of the investment material in ring section 27 is also coated with a separating material or powder. It will be noted that the wax pattern projects slightly below the middle ring section into the lower ring section and slightly above the middle ring section into the upper ring section 26. The upper ring section 26 as viewed in Fig. 1 is next filled with investment material to the top edge thereof which is permitted to harden. The mold or flask is then placed in boiling water to soften the wax. The three sections of the flask are separated and the wax boiled out, the pin 11 and sprue member 21 removed leaving the outer sprue member 12 embedded in the investment material and forming a cavity or mold 39 in the form of a bridge in the investment material at the point where the wax pattern 10 was and being shaped like said pattern. This cavity or mold is in the middle ring section and is exposed on both the top and bottom sides or surfaces including the cusps 10' of gold on one of said surfaces. This exposure permits inspection of the interior of the cavity or mold for cleaning and permits opaquing the gold cusps or gold surface so that the gold will not show through the plastic tooth material. A chamber 40 is left inside the outer sprue member 12 where the inner sprue member was and said chamber and mold 39 are connected by a passage or gate 41 as shown in Fig. 2. The acrylic material is forced through the outer sprue 12 by the plunger and the case is trial packed thus exposing the buccal and labial surfaces of the bridge for staining purposes.

The three flask sections 25, 26 and 27 are connected together again after the pin and inner sprue member are removed and are placed on the base 29 in inverted position, that is, the section 26 is placed on the bottom and the section 25 with sprue member 12 placed at the top (Figs. 2 and 3) and they are clamped in this position by the nut member 33. It will be seen that disc 15 and the outer sprue member 12 seal the upper end of the flask. The apparatus is now in position to receive the plastic or acrylic material 42. This material is forced into the cavity or mold 39 through the chamber 40 in the outer sprue member 12. The material may first be tightly packed manually by hand and then stronger pressure may be exerted thereupon by suitable pressing apparatus.

The hand packing apparatus consists of a tubular member 43 having a narrow central passage 44 terminating at its upper end in a widened chamber 45 and at its lower end in an internally screw-threaded recess 46. The tube is adapted to be inserted through the opening in the nut member 33 and to have its threaded recessed end 46 threaded to the threaded extension 14 of the outer sprue member as shown in Figure 2. The upper end of the tube projects above the upper end of the nut member. The plastic material 42 is placed in the upper chamber 45 of the tube and it is forced through the passage 44 and into the cavity or mold 39 by means of a plunger 47 provided with a knob or handle 48. The material is packed into the mold 39 by means of the plunger 47.

The tube 43 and plunger 47 may be removed and a pressure device mounted in position as shown in Figure 3 for condensing the plastic material. This device consists of a cylindrical hollow housing 49 having the lower half of its outer surface screw-threaded as indicated at 50. The bottom of the housing is closed by a wall 51 having a central opening 52 formed therein. The top of the housing is closed by a plug member 53 having a central passage 54 therethrough. A stem or plunger member 55 extends centrally through the housing and through the plug member exteriorly of the housing at the top and through the opening 52 exteriorly of the housing at the bottom end projecting through the nut member 33 and into the sprue member 12. A coiled spring 56 surrounds the stem inside the housing with its upper end impinging against the bottom of the plug member and its bottom end seating on a disc member 57 fixed to the stem. The housing is adapted to be turned by a handle or lever 58 fitted in aligned openings 59 and 60 in the top of the housing and plug member, respectively. Turning of the housing compresses the spring against the disc member 57 forcing the stem downwardly thereby pressing the plastic denture material in the outer sprue member and in the chamber 42 and mold 39, thus properly filling the mold with such material and causing the same to be properly condensed. As the lower end of the stem presses against the denture material, it meets with resistance whereby the stem is moved upwardly relative to the plug member 55. A scale 61 formed on the upper end of the stem is adapted to coact with the upper surface of the top end of the plug member for indicating the degree of pressure being exerted on the denture material for regulating purposes. The constant pressure is automatically applied to the denture material within the mold and the operator is free to attend to other work.

When sufficient pressure has been applied, the entire apparatus is placed in a hot bath, oven, furnace or the like whereupon the plastic material hardens or sets while pressure is retained thereupon.

After processing the casting, it is allowed to cool. The sections of the hollow flask are then separated by a suitable tool. The restoration is then removed from the investment and cleaned.

The nut member 33 may be manipulated by a lever or handle bar 62 fitting in opposed openings 63 formed in said nut member adjacent its top end.

It will be noted that the disc portion 12 of the outer sprue member 12 seals the end of the flask and keeps the acrylic clean. The disc portion also locks the lower section 25 to the disc 17 thereby forming a unitary structure keeping the flask sections immobile and thereby making the pouring of the investment material easier and thereby preventing injury to the pattern.

The nut member 33 clamps the flask sections tightly together and also serves as a bearing for the pressure device.

The flask and associated parts are inserted through the open front or rear of the frame to proper position on the base 29.

I claim:

1. In apparatus of the kind described, a flask comprising two end ring sections and an intermediate ring section for receiving investment material, an outer sprue hollow member sealing one end of one of the end ring sections and extending inwardly into the intermediate ring section, an inner sprue member extending through said outer sprue member and into said intermediate ring section, said inner sprue member having a central opening therethrough, a pin in said central opening and projecting outwardly thereof into said intermediate ring section and a dental bridge mold on the projecting portion of said pin disposed in said intermediate ring section.

2. As an article of manufacture, a flask for processing dental restorations including two end ring sections and an intermediate ring section detachably connected to each other for receiving investment material, one of said end ring sections carrying means for supporting a dental bridge pattern inwardly of the flask and disposed within and framed by the intermediate ring section in such manner that the mold formed thereby is exposed on both the upper and lower surfaces of said intermediate ring and may be cleaned and opaqued on all surfaces.

3. In apparatus of the kind described, a flask comprising two end ring sections and an intermediate ring section for receiving investment material, an outer sprue member sealing one end of one of the end ring sections and extending inwardly into the intermediate ring section, an inner sprue member extending through said outer sprue member and into said intermediate ring section, said inner sprue member having a central opening therethrough, a pin in said central opening and projecting outwardly thereof into said intermediate ring section and a dental bridge pattern on the projecting portion of said pin disposed within and framed by said intermediate ring section, said pattern including wax molds of teeth so arranged that the surfaces of the molds are exposed at the top and bottom surfaces of said intermediate ring section whereby the mold formed by said pattern may be cleaned and whereby the buccal and labial surfaces of the bridge are exposed for staining purposes.

IRVING HORDES.

REFERENCES CITED

The following references are of record in the file of this patent:

UNITED STATES PATENTS

| Number | Name | Date |
| --- | --- | --- |
| 61,174 | Dowlin | Jan. 15, 1867 |
| 544,095 | Griswold | Aug. 6, 1895 |
| 861,598 | Moscovitz | July 30, 1907 |
| 2,421,698 | Hordes | June 3, 1947 |
| 2,442,847 | Galley | June 8, 1948 |